United States Patent
Gooden et al.

(10) Patent No.: US 9,366,336 B2
(45) Date of Patent: Jun. 14, 2016

(54) TRANSMISSION SERVICE WARM-UP FEATURE

(71) Applicant: Ford Global Technologies, LLC, Dearborn, MI (US)

(72) Inventors: James Thomas Gooden, Canton, MI (US); Leo Joseph Esper, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/493,476

(22) Filed: Sep. 23, 2014

(65) Prior Publication Data
US 2016/0084371 A1    Mar. 24, 2016

(51) Int. Cl.
*F16H 61/00* (2006.01)
*F16H 57/04* (2010.01)

(52) U.S. Cl.
CPC ........ *F16H 61/0006* (2013.01); *F16H 57/0413* (2013.01); *F16H 61/0025* (2013.01); *F16H 2061/0075* (2013.01)

(58) Field of Classification Search
None
See application file for complete search history.

(56) References Cited

U.S. PATENT DOCUMENTS

| | | | |
|---|---|---|---|
| 6,577,959 B1 | 6/2003 | Chajec et al. | |
| 8,047,315 B2 * | 11/2011 | Motoike | B60K 6/445 180/65.265 |
| 2002/0155922 A1 * | 10/2002 | Okuwaki | F16H 57/0413 477/98 |
| 2013/0054058 A1 * | 2/2013 | Hawkins | B60T 1/062 701/22 |

FOREIGN PATENT DOCUMENTS

| | | |
|---|---|---|
| CN | 103717945 A | 4/2014 |
| DE | 69327759 T2 | 10/2000 |
| JP | 2006307950 B2 | 9/2011 |

* cited by examiner

*Primary Examiner* — Erin D Bishop
(74) *Attorney, Agent, or Firm* — James Dottavio; Brooks Kushman P.C.

(57) ABSTRACT

A service warm-up feature warms transmission fluid to normal operating temperature faster than normal idle without requiring continuous technician attention. This facilitates checking the transmission fluid level. The feature increases the warm-up rate by commanding an increased line pressure and an increased idle speed, which causes more heat to be generated as the fluid flows through restrictions at an increased flow rate with an increased pressure drop. The warm-up rate may be further increased by holding the turbine shaft stationary to increase torque converter heat generation. Various precautions prevent accidental vehicle movement.

18 Claims, 4 Drawing Sheets

TRANSMISSION SERVICE WARM-UP FEATURE

TECHNICAL FIELD

This disclosure relates to the field of automatic transmission controls. More particularly, the disclosure pertains to a feature to accelerate transmission warm-up during a fluid level checking procedure.

BACKGROUND

Automatic transmissions often include a number of hydraulically actuated clutches. A transmission ratio is selected by routing pressurized hydraulic fluid to a subset of these clutches. An improper quantity of fluid in the transmission may cause a number of issues. For example, when there is too little fluid, pump cavitation may produce any annoying noise. In extreme cases, the transmission may fail to stay engaged. When there is too much fluid, fuel economy may be degraded. Consequently, when a customer brings a vehicle in for service with transmission related complaints, one of the things that a technician is likely to check is the transmission fluid level. In order to accurately measure the fluid quantity, the transmission fluid must be warmed to the normal operating range. Warming the transmission occupies shop space and/or requires technician time. Therefore, it is desirable to be able to warm the transmission quickly in a service environment. Since the condition that compelled the owner to bring the vehicle for service may involve a failure of a transmission component, the service warm-up procedure must operate in the presence of some types of component failures.

SUMMARY OF THE DISCLOSURE

A transmission implements a service warm-up procedure. The transmission includes a sump configured to hold a quantity of fluid and a pump configured to draw fluid from the sump and deliver it at a line pressure. In a normal mode, a controller commands a nominal line pressure value and a nominal flow rate value. The flow rate may be controlled by setting an engine idle speed or by setting a pump displacement. In response to activation of the service warm-up feature, the controller increases at least one of the line pressure and the flow rate command. In response to the fluid reaching an operating temperature, the controller returns to the normal idle mode. The transmission may also include a torque converter and a plurality of clutches. In the service warm-up mode, the controller may engage a subset of the clutches to hold the turbine shaft against rotation. The transmission may include a manual valve that precludes engagement of clutches that establish a power flow path between the turbine shaft and the transmission output shaft but that permits engagement of clutches to hold the turbine shaft against rotation. If the service warm-up feature is activated while the transmission is not in park, the controller may engage at least one additional clutch to hold the transmission output shaft against rotation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
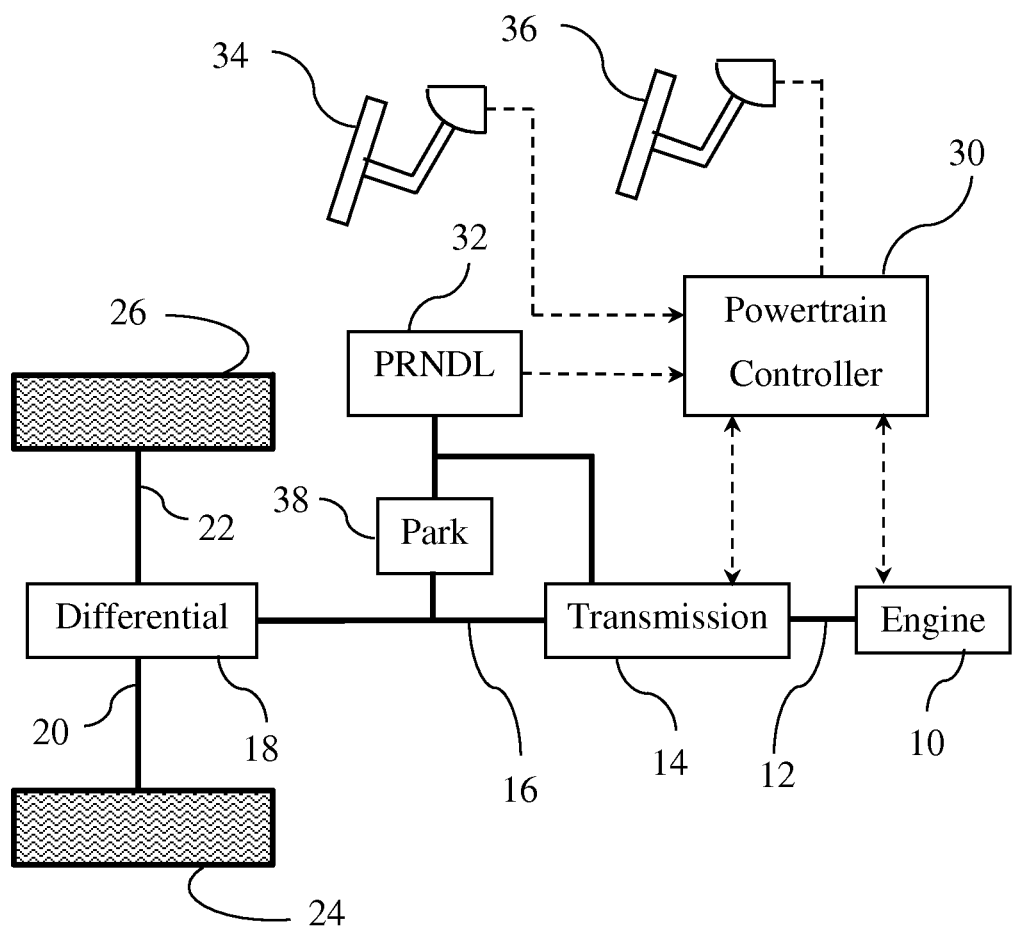
FIG. 1 is a schematic diagram of a vehicle powertrain.

FIG. 1 schematically illustrates a vehicle powertrain. Engine 10 converts chemical energy in the fuel into mechanical power which is delivered to crankshaft 12. Transmission 14 modifies the speed and torque to suit vehicle requirements and delivers the power to transmission output shaft 16. Differential 18 distributes the power to a right half shaft 20 and a left half shaft 22 which drive right wheel 24 and left wheel 26 respectively. The differential provides approximately equal torque to each wheel while permitting slight speed differences as the vehicle turns a corner. In a rear wheel drive vehicle, the transmission output shaft 16 may be connected to the differential 18 by a driveshaft. The rear differential may include a hypoid gear which changes the axis of rotation and reduces the speed by a final drive ratio. In a front wheel drive vehicle, the differential 18 and the transmission 14 may be integrated and called a transaxle. In a transaxle, power may be transferred from the transmission output shaft 16 to the differential by layshaft gearing or by a chain and a planetary final drive unit.

Powertrain controller 30 adjusts the power produced by engine 10 and the state of transmission 14 based on signals from various sensors. The sensors may include a gear selector 32, a brake pedal 34, and an accelerator pedal 36 that are manipulated by the driver to indicate intent to move. To move forward, the driver selects a drive (D) position with the gear selector 32, releases brake pedal 34, and then depresses accelerator pedal 36 in proportion to the desired forward acceleration. Similarly, to move backward, the driver selects a reverse (R) position with the gear selector 32, releases brake pedal 34, and then depresses accelerator pedal 36 in proportion to the desired rearward acceleration. The park (P) position is used to signal intent to prevent vehicle movement. The gear selector may be mechanically linked to a park mechanism 38 that, when engaged, secures transmission output shaft 16 against rotation. The neutral (N) position indicates intent to permit vehicle movement but not to propel the vehicle using engine power. Gear selector 32 may also include a mechanical connection to transmission 14. Powertrain controller may also use signals from other types of sensors such as speed sensors, torque sensors, pressure sensors, temperature sensors, etc.

Figure 2:
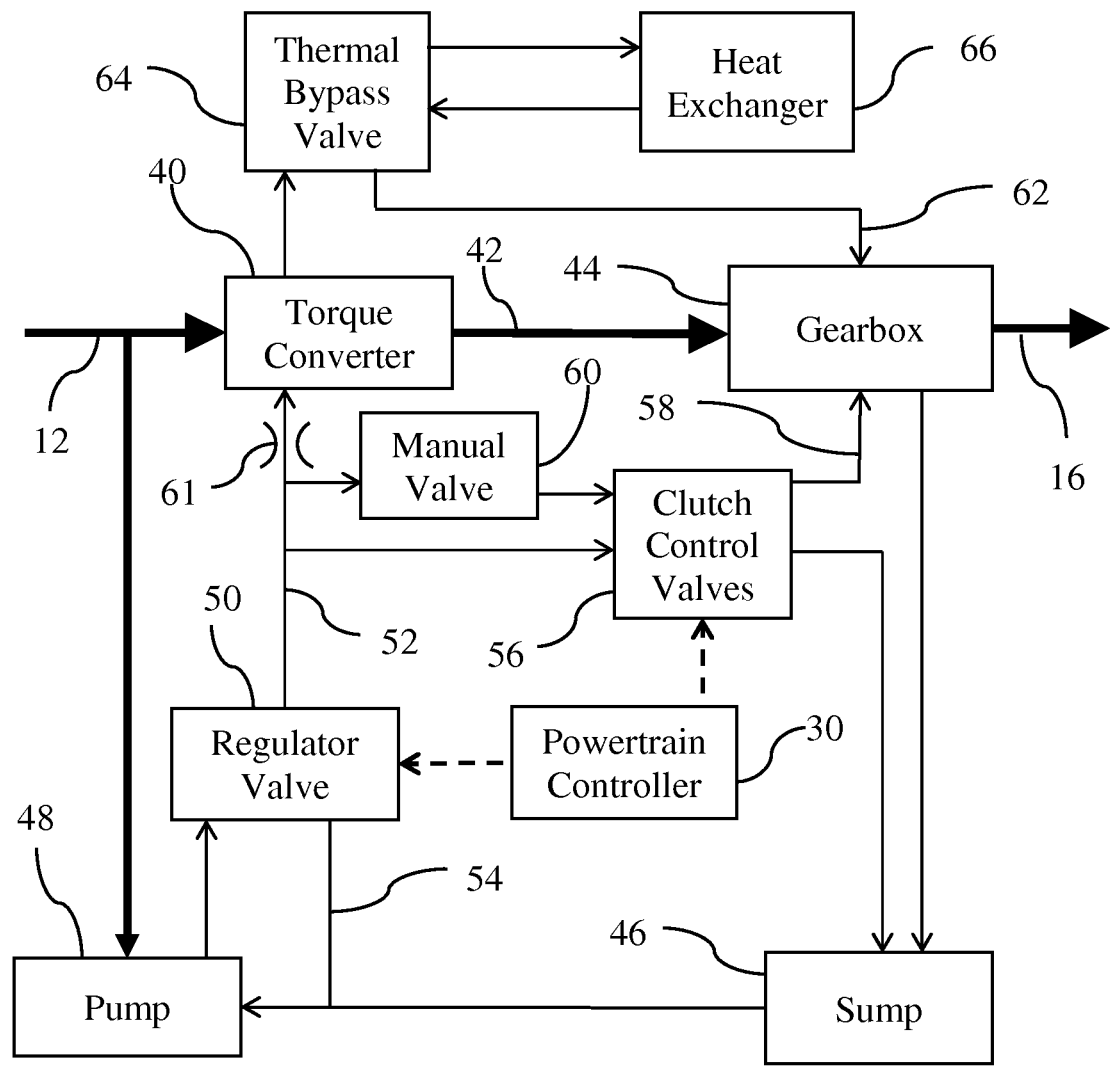
FIG. 2 is a schematic diagram of a transmission suitable for use in the powertrain of FIG. 1.

FIG. 2 schematically illustrates an exemplary transmission system. The flow of mechanical power is indicated by heavy lines. Flow of hydraulic fluid is shown by solid lines. Dashed lines indicate the flow of signals. The engine crankshaft 12 drives a torque converter 40. Torque converter 40 drives turbine shaft 42 which provides power to gearbox 44. Gearbox 44, in turn, drives transmission output shaft 16.

Torque converter 40 includes an impeller fixed to engine crankshaft 12, a turbine fixed to turbine shaft 42, and a stator. The torque applied to turbine shaft 42 and the resistance torque applied to engine crankshaft 12 both depend upon the relative speeds of the two shafts. Both impeller torque and turbine torque are zero when the speeds are equal and both increase when crankshaft 12 rotates faster than turbine shaft 42. When the turbine shaft is stationary, the turbine torque is at a maximum multiple of the crankshaft torque. The multiple decreases to unity as the turbine shaft speed approaches the crankshaft speed. Torque converter 40 is filled with fluid. The power delivered to turbine shaft 42 is generally less than the power received from engine crankshaft 12. The remaining power is absorbed by the fluid as heat.

Gearbox 44 may include gears and clutches configured to establish a variety of power flow paths between turbine shaft 42 and transmission output shaft 16. The different power flow paths establish different speed ratios. Which power flow path is established depends upon which clutches are engaged. The set of clutches in gearbox 44 may include hydraulically actuated friction clutches. A hydraulically actuated friction clutch is engaged by supplying pressurized fluid to a piston apply chamber. The torque capacity of the clutch is linearly related to the fluid pressure. When the pressure is reduced, the clutch releases.

Sump 46, typically located at the lowest point of the transmission, contains a supply of transmission fluid at ambient pressure. Pump 48 draws fluid from sump 46 and delivers it to the hydraulic valve body at elevated pressure. Pump 48 may be a positive displacement pump that transfers a fixed quantity of fluid per revolution. In some embodiments, the pump displacement may be fixed while in other embodiments the displacement may vary in response to commands from the controller. Pump 48 may be driven by the engine 10 via crankshaft 12. The power required to drive the pump is proportional to the pressure increase multiplied by the flow rate. Regulator valve 50 controls the pressure of line pressure circuit 52 by exhausting a fraction of the flow from pump 48 to recirculation circuit 54. The Regulator valve accomplishes this by adjusting the size of a valve opening leading to the recirculation circuit such that the pressure in the line pressure circuit matches a commanded line pressure from powertrain controller 30. As fluid flows through various restrictions, the pressure drops and energy is converted to heat in the fluid. The power conversion to heat is proportional to the flow rate multiplied by the pressure difference across the restriction. A set of clutch control valves 56 establish pressures between the line pressure and ambient pressure in a number of clutch apply circuits 58 according to commands from powertrain controller 30. There is one clutch apply circuit for each hydraulically actuated friction clutch in gearbox 44. In some embodiments, there may be one clutch control valve for each clutch apply circuit. In other embodiments, a network of hydraulic switches may direct flow from a smaller number of clutch control valves to particular clutch apply circuits while directing either line pressure or exhaust pressure to the others. Some embodiments may include a manual valve 60 that is mechanically linked to the gear selector 32. Manual valve 60 may inhibit the supply of line pressure to certain clutch apply circuits depending on the position of gear selector 32 to avoid possible error states. For example, when the gear selector is in reverse, the manual valve may preclude applying clutches that would result in forward transmission output torque.

Pump 48 also supplies fluid to fill torque converter 40 through orifice 61 and to lubricate gearbox components. When the fluid is cool, fluid exiting torque converter 40 is routed into lube circuit 62 by thermal bypass valve 64. In addition to providing lubrication, this fluid absorbs heat that is generated by friction between transmission gears and heat that is dissipated by slipping friction clutches. After flowing past gearbox components, the fluid drains back to sump 46. Since the fluid absorbs heat from many processes in the transmission, it gradually gets warm. When a predetermined temperature is reached, thermal bypass valve 64 diverts the flow exiting the torque converter through a heat exchanger 66 before routing the fluid to lube circuit 62. In some embodiments, the heat exchanger may be bypassed whenever a torque converter bypass clutch is engaged, regardless of the fluid temperature.

For a given total quantity of fluid in the transmission, the level of fluid in sump 46 may vary depending on a number of factors. First, the fluid density varies with temperature. Second, the amount of fluid contained within the heat exchanger can vary if the vehicle has been sitting and does not stabilize until flow through the heat exchanger is established. Third, the rate at which fluid drains back to the sump varies based on viscosity which is strongly correlated with temperature. If the total amount of fluid is insufficient, due to a leak for example, then sump 46 may become empty and pump 48 will not have fluid to draw. If the total amount of fluid is excessive, due to improper servicing for example, then the excess fluid causes increased parasitic drag decreasing vehicle fuel economy. Because some customer complaints may be caused by improper fluid quantity, checking the fluid quantity is a common step in vehicle service. However, because the level in sump 46 varies, it is important to check the fluid in a known condition in which the level in sump 46 accurately indicates the total quantity of fluid. The known condition may be a condition in which the fluid is at a stabilized operating temperature such that fluid is flowing through heat exchanger 66. If the vehicle has been resting, the service technician must operate the vehicle to heat the transmission fluid. This may be done by driving the vehicle. However, driving the vehicle takes technician time and may not be feasible based on the reason the vehicle is being serviced. Alternatively, the technician may start the vehicle and allow it to idle unattended. Although this may eventually heat the fluid to the required temperature, the process may require an excessive amount of time during which a service bay is occupied. In some circumstances, the temperature will stabilize at a level below the required temperature if allowed to idle in park.

Fluid warm-up in preparation for fluid level checking can be accelerated by programming the powertrain controller to operate in a special warm-up mode. This mode is activated by a service technician in a manner that makes it unlikely that a driver would ever accidentally activate the warm-up mode. For example, the mode could be activated by sending a code to the controller through a service interface to the controller. Alternatively, the mode could be activated by moving the gear selector among positions in a special sequence that would be unlikely to occur in normal driving (i.e. Low for 3-5 seconds then Neutral for 3-5 seconds then Reverse for 3-5 seconds then Drive for 3-5 seconds and then Park). Some vehicles have a touch screen interface that could be programmed to receive the instruction to activate the warm-up mode.

Upon entering the warm-up mode, the powertrain controller may increase power consumed by the pump to pressurize oil. Since this power is all eventually dissipated as heat as the fluid flows through various orifices and decreases in pressure, the oil will warm-up faster. One way to increase the pump power is to increase the fluid flow rate by increasing the engine idle speed. For example, the idle speed may be set to 600 rpm in a normal idle mode and raised to 3000 rpm in the service warm-up mode. If the pump displacement is controllable, pump power may be increased by commanding the pump to the maximum displacement to increase fluid flow rate. Finally, pump power may be increased by increasing the commanded line pressure. For example, the line pressure may be set to 100 psi in a normal idle mode and raised to 250 psi in the service warm-up mode. In addition to increasing the warm-up rate, these changes reduce the chance that any parts of the transmission will receive insufficient flow if there are internal leaks present.

While operating in the service warm-up mode, the controller may monitor one or more temperature sensors and other sensors. If any sensors indicate unexpected readings, the controller may inform the technician by setting a code or other means to assist the technician in diagnosing the abnormality. When the temperature reaches the desired operating temperature for fluid level checking, for example 200 degrees Fahrenheit, the controller exits the warm-up mode and may signal the technician by sounding the horn, flashing the lights, or other means. Upon exiting the warm-up mode, the controller returns the engine speed to the normal idle engine speed and returns the line pressure to the normal idle line pressure.

Figure 3:
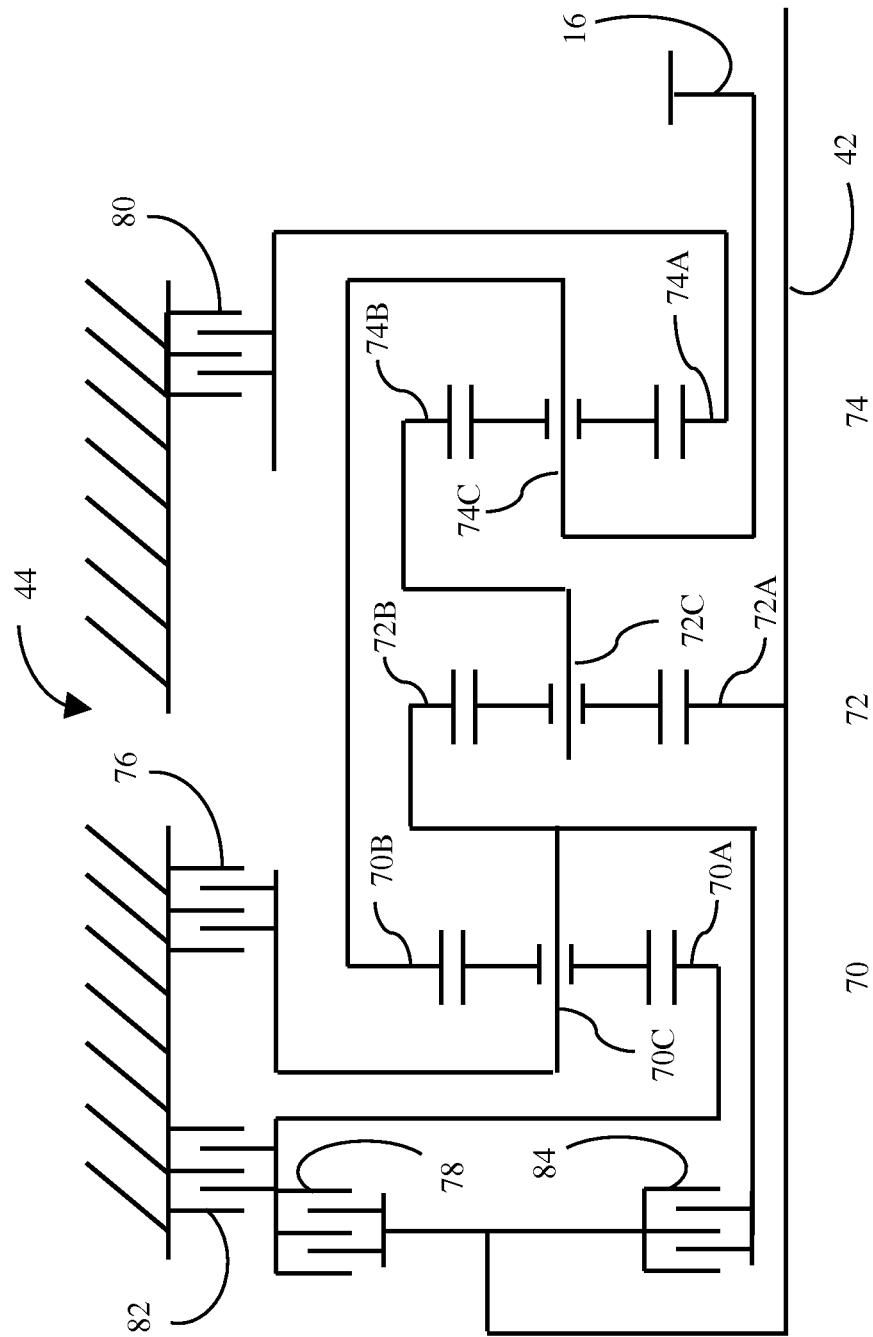
FIG. 3 is a schematic diagram of a gearing arrangement suitable for use in the transmission of FIG. 2.

Depending upon the gearing arrangement of gearbox 44 and the design of manual valve 60, it may be possible to engage clutches to further increase the warm-up rate. FIG. 3 illustrates an exemplary gearing arrangement. The gearing arrangement includes planetary gear sets 70, 72, and 74. The sun gear 72A of gear set 72 is fixedly coupled to turbine shaft 42. The ring gear 70B of gear set 70 and the carrier 74C of gear set 74 are fixedly coupled to transmission output shaft 16. The carrier 70C of gear set 70 is fixedly coupled to the ring gear 72B of gear set 72. This combination is selectively held against rotation by brake 76 and selectively coupled to turbine shaft 42 by clutch 84. The carrier 72C of gear set 72 is fixedly coupled to the ring gear 74B of gear set 74. The sun gear 70A of gear set 70 is selectively held against rotation by brake 82 and selectively coupled to turbine shaft 42 by clutch 78. Finally, the sun gear 74A of gear set 74 is selectively held against rotation by brake 80.

When gear selector 32 of FIG. 1 is in the reverse position, the controller would ordinarily engage brake 76 and clutch 78 to establish a reverse speed ratio between turbine shaft 42 and output shaft 16. The manual valve may be configured to preclude engagement of any of the remaining clutches. Similarly, when gear selector 32 is in the drive position with the vehicle stationary, the controller would ordinarily engage brakes 76 and 80 to establish a first positive speed ratio between turbine shaft 42 and output shaft 16. As the vehicle accelerates, the controller would engage different combinations of two clutches to establish different gear ratios. When the vehicle is in neutral or park, the controller would normally engage at most one clutch to avoid establishing any power flow path between turbine shaft 42 and output shaft 16. The manual valve may be configured to preclude engaging multiple clutches when in neutral or park.

When the engine is idling with the gearbox in neutral or park, turbine shaft 42 will typically rotate at nearly the same speed as engine crankshaft 12. Consequently, the torque converter does not transmit any torque and does not dissipate heat into the fluid. However, if turbine shaft 42 is held stationary, then the torque converter will dissipate heat and accelerate warm-up. In the gear configuration of FIG. 3, turbine shaft 42 may be held stationary by engaging brake 76 in combination with clutch 84, for example. Alternatively, turbine shaft 42 may be held stationary by engaging brake 82 in combination with clutch 78. The controller may engage one of these combinations while operating in the service warm-up mode. Designing the manual valve to permit one of these combinations does not present the risk of accidentally establishing a power flow path.

If the manual valve does not permit restraining turbine shaft 42 while the gear selector is in park, then the warm-up mode may be programmed to operate while the vehicle is in drive. When the warm-up mode is active, the controller reacts to a shift into drive by engaging clutches to hold the turbine shaft stationary instead of engaging clutches to establish a forward power flow path. Precautions may be taken to ensure that the vehicle does not have a tendency to move, even in the presence of failed components. The controller may be programmed to monitor transmission output shaft speed and to release all clutches if any speed is detected. Since the parking mechanism is disengaged when the gear selector is in drive, other means of holding the vehicle stationary may be required. The technician may be forced to set a parking brake before this feature of the warm-up mode is activated. If the vehicle braking system allows the controller to apply the brakes, that will prevent vehicle movement. The controller may engage additional clutches to hold the output shaft stationary, such as the combination of brakes 76 and 82.

Figure 4:
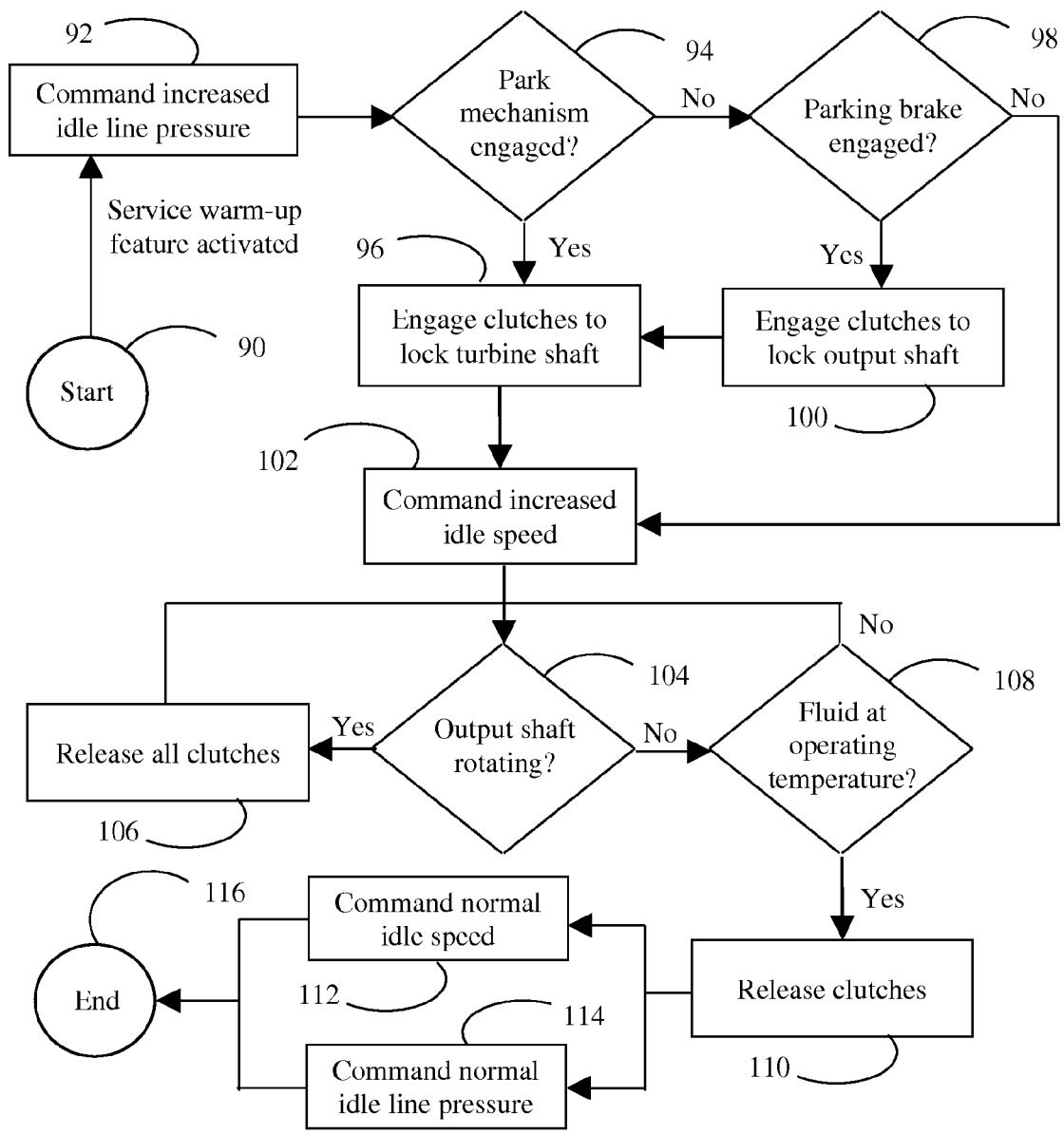
FIG. 4 is a flow chart illustrating a method of quickly warming the fluid in a transmission such as the transmission of FIG. 2 in a service environment in preparation for fluid level checking.

FIG. 4 illustrates a method of controlling a transmission during a service warm-up mode. Some embodiments may utilize all of the illustrated steps to increase the warm-up rate while other embodiments will utilize various subsets of the illustrated steps. Activation of the service warm-up mode while the vehicle is idling at 90 causes the controller to increase the line pressure at 92 from the normal idle line pressure to an elevated line pressure. This increases the power loss due to fluid flowing through restrictions, increasing the warm-up rate. Next, if possible without risk of vehicle motion, the controller engages clutches to hold the turbine shaft stationary to increase power dissipation of the torque converter and further increase the warm-up rate. Specifically, the controller checks whether the park mechanism is engaged at 94 and, if so, engages clutches to lock the turbine shaft at 96. If the park mechanism is not engaged at 94, the controller checks whether a parking brake is engaged at 98. If so, the controller engages clutches to hold the transmission output shaft at 100 and then engaged additional clutches to hold the turbine shaft at 96. This provides redundant assurance against vehicle movement. If the parking brake fails, the clutches hold the vehicle against movement. If one of the clutches holding the transmission output shaft against movement fails, the parking brake will hold the vehicle. If the clutches that are engaged at 96 do not establish a power flow path to the transmission output shaft, then these steps are merely precautionary. If the parking brake is not set at 98, then control proceeds to 102 without holding the turbine shaft. At 102, the idle speed is increased to further increase the warm-up rate.

While the transmission is warming up, the controller periodically checks to ensure that the procedure is proceeding properly. At 104, the controller checks whether the output shaft is rotating. If so, all clutches are released at 106. At 108. The controller checks whether the transmission fluid has reached operating temperature at which the fluid level may be accurately checked. If not, the controller remains in the warm-up mode. This cycle of checks may be executed at regular intervals. The controller may make additional checks and set codes during this cycle to assist the technician in diagnosing any abnormality. These additional checks may include items that would not be checked during normal idle or that would not result in the setting of service codes. The service warm-up procedure terminates when the temperature reaches operating temperature at 108. When the procedure terminates, and clutches that would not be engaged during normal idle are released at 110. At 112 and 114, the controller returns the idle speed and line pressure to the normal idle values. The method terminates at 116 with the vehicle in normal idle at operating temperature.

While exemplary embodiments are described above, it is not intended that these embodiments describe all possible forms encompassed by the claims. For example, although certain parameters are described as calibratable constants, adaptive methods to dynamically adjust these parameters during operation are possible. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission having a service warm-up feature, the transmission comprising:
   a sump configured to hold a quantity of fluid;
   a pump configured to draw the fluid from the sump and deliver the fluid to a valve body at a line pressure and a flow rate; and
   a controller programmed to
      in a normal idle mode, command the line pressure to a nominal pressure value and command the flow rate to a nominal flow value,
      in response to activation of the service warm-up feature, command the line pressure to a revised pressure value and command the flow rate to a revised flow value such that a product of the revised pressure value and the revised flow value exceeds a product of the nominal pressure value and the nominal flow value to accelerate fluid warm-up, and
      in response to a fluid temperature reaching a first threshold suitable for checking transmission fluid level while operating at the revised pressure value and the revised flow value, resume operation in the normal idle mode.

2. The transmission of claim 1 further comprising:
   a transmission cooler; and
   a cooler bypass valve configured to route fluid through the cooler in response to the fluid temperature exceeding a second threshold less than the first threshold.

3. The transmission of claim 1 further comprising:
   a torque converter having an impeller adapted for fixation to an engine crankshaft and a turbine fixed to a turbine shaft; and
   a gearbox having a plurality of clutches configured to establish various speed ratios between the turbine shaft and a transmission output shaft when engaged in various combinations.

4. The transmission of claim 3 wherein the controller is further programmed to, in response to activation of the service warm-up feature, command pressure to a subset of the plurality of clutches to hold the turbine shaft against rotation.

5. The transmission of claim 4 further comprising:
   a park mechanism configured to hold the transmission output shaft against rotation in response to a gear selector being in a park position; and
   a manual valve configured to preclude, when the gear selector is in the park position, engagement of any combination of clutches that would establish a power flow path between the turbine shaft and the transmission output shaft and to permit, when the gear selector is in the park position, engagement of the subset of the plurality of clutches that holds the turbine shaft against rotation.

6. The transmission of claim 4 wherein the controller is further programmed to, in response to activation of the service warm-up feature, command pressure to at least one additional clutch to hold the transmission output shaft against rotation while a gear selector is in a drive position.

7. The transmission of claim 1 wherein the controller is further programmed to monitor a sensor while operating at the revised pressure value and the revised flow rate, and to set a code in response to a sensor reading that would not generate the code in the normal idle mode.

8. A transmission controller comprising:
   input communications channels configured to receive a service warm-up command and a fluid temperature signal;
   output communications channels configured to send engagement commands to a plurality of clutches; and
   control logic configured to respond to the service warm-up command by engaging a subset of the plurality of clutches to lock a turbine shaft and then releasing the clutches in response to the fluid temperature reaching a predetermined value.

9. The transmission controller of claim 8 wherein:
   the output communications channels are further configured to send a line pressure command; and
   the control logic is further configured to respond to the service warm-up command by increasing the commanded line pressure and then decreasing the commanded line pressure in response to the fluid temperature reaching the predetermined value.

10. The transmission controller of claim 9 wherein:
   the output communications channels are further configured to send a flow rate command; and
   the control logic is further configured to respond to the service warm-up command by increasing the commanded flow rate, and then decreasing the commanded flow rate in response to the fluid temperature reaching the predetermined value.

11. The transmission controller of claim 10 wherein the commanded flow rate is increased by increasing an engine idle speed.

12. The transmission controller of claim 8 wherein engagement of the subset of the plurality of clutches does not establish a power flow path between the turbine shaft and a transmission output shaft.

13. The transmission controller of claim 8 wherein:
   the input communications channels are further configured to receive an indication of whether a transmission park mechanism is engaged to hold a transmission output shaft against engagement; and the control logic is further configured to inhibit engagement of the subset of the plurality of clutches in response to the transmission park mechanism not being engaged.

14. The transmission controller of claim 8 wherein:

the input communications channels are further configured to receive an indication of whether a parking brake is engaged to prevent vehicle movement; and the control logic is further configured to inhibit engagement of the subset of the plurality of clutches in response to the parking brake not being engaged.

15. The transmission controller of claim 8 wherein the control logic is further configured to command engagement of at least one additional clutch to hold a transmission output shaft against rotation.

16. The transmission controller of claim 8 wherein:

the input communications channels are further configured to receive an indication of rotation of a transmission output shaft; and the control logic is further configured to release the subset of the plurality of clutches in response to rotation of the transmission output shaft.

17. A transmission controller comprising:

input communications channels configured to receive a service warm-up command, a fluid temperature signal, and a signal from a sensor;

output communications channels configured to send a flow rate command; and control logic configured to respond to the service warm-up command by increasing the commanded flow rate and to set a code in response to a sensor reading that would not generate a code in a normal idle mode.

18. The transmission controller of claim 17 wherein the control logic is further configured to monitor the fluid temperature and to decrease the commanded flow rate in response to the fluid temperature reaching a predetermined value.

* * * * *